(12) United States Patent
Liu et al.

(10) Patent No.: US 11,630,531 B2
(45) Date of Patent: Apr. 18, 2023

(54) NANO PAPER AND PREPARATION METHOD, METHOD FOR IMAGE PROCESSING AND ELECTRONIC DEVICE

(71) Applicants: Beijing BOE Technology Development Co., Ltd., Beijing (CN); BOE Technology Group Co., Ltd., Beijing (CN)

(72) Inventors: Kairan Liu, Beijing (CN); Wei Cao, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/420,962

(22) PCT Filed: Jun. 17, 2020

(86) PCT No.: PCT/CN2020/096569
§ 371 (c)(1),
(2) Date: Jul. 6, 2021

(87) PCT Pub. No.: WO2020/253720
PCT Pub. Date: Dec. 24, 2020

(65) Prior Publication Data
US 2022/0100339 A1    Mar. 31, 2022

(30) Foreign Application Priority Data
Jun. 20, 2019 (CN) .......................... 201910537795.2

(51) Int. Cl.
*G06F 3/041* (2006.01)
*G01L 1/20* (2006.01)
*G06F 3/045* (2006.01)

(52) U.S. Cl.
CPC .......... *G06F 3/04142* (2019.05); *G01L 1/205* (2013.01); *G06F 3/045* (2013.01); *G06F 2203/04102* (2013.01)

(58) Field of Classification Search
CPC ................. G06F 3/04142; G06F 3/045; G06F 2203/04102; G06F 3/041–04164;
(Continued)

(56) References Cited

U.S. PATENT DOCUMENTS

| 2007/0008299 A1 | 1/2007 | Hristov |
| 2010/0315373 A1 | 12/2010 | Steinhauser et al. |

(Continued)

FOREIGN PATENT DOCUMENTS

| CN | 1818839 A | 8/2006 |
| CN | 1945516 A | 4/2007 |

(Continued)

OTHER PUBLICATIONS

Preparation, Properties and Applications of Nanopaper Substrates for Flexible Electronics.
(Continued)

*Primary Examiner* — Temesghen Ghebretinsae
*Assistant Examiner* — Ivelisse Martinez Quiles
(74) *Attorney, Agent, or Firm* — IPro, PLLC

(57) ABSTRACT

A nanopaper and a fabricating method thereof, a method of graphic processing and an electronic device are provided. The nanopaper includes: a transparent substrate, wherein the transparent substrate includes a micro-nano-fiber; a plurality of pressure sensing units, wherein the pressure sensing units are located on one side of the transparent substrate, and resistances of the pressure sensing units are able to vary with deformation of the transparent substrate; and a plurality of leads, wherein the plurality of leads are connected to the pressure sensing units, and are configured to be able to
(Continued)

separately output a sensing signal of each of the plurality of pressure sensing units.

13 Claims, 5 Drawing Sheets

(58) Field of Classification Search
CPC ... G06F 3/04144; G06F 3/0414; G01L 1/205; G01L 1/20–2293; D21H 11/18; D21H 27/00
See application file for complete search history.

(56) References Cited

U.S. PATENT DOCUMENTS

| | | | |
|---|---|---|---|
| 2015/0070276 A1 | 3/2015 | Pance | |
| 2017/0010704 A1* | 1/2017 | Chen | G02F 1/136286 |
| 2017/0308198 A1* | 10/2017 | Yoon | G06F 3/0445 |
| 2017/0357344 A1* | 12/2017 | Hong | G06F 3/045 |
| 2018/0010299 A1* | 1/2018 | Hu | C01B 32/182 |
| 2018/0210570 A1 | 7/2018 | Jiang et al. | |
| 2018/0210601 A1* | 7/2018 | Chi | G06F 3/0412 |
| 2018/0300004 A1 | 10/2018 | Kugler et al. | |
| 2019/0121454 A1 | 4/2019 | Kolarov | |
| 2022/0196492 A1* | 6/2022 | Burghoorn | G01L 1/2287 |

FOREIGN PATENT DOCUMENTS

| | | | |
|---|---|---|---|
| CN | 101836178 A | | 9/2010 |
| CN | 102763055 A | | 10/2012 |
| CN | 103196955 A | | 7/2013 |
| CN | 103488415 A | | 1/2014 |
| CN | 103966907 A | | 8/2014 |
| CN | 104035483 A | | 9/2014 |
| CN | 203909752 U | | 10/2014 |
| CN | 104750273 A | | 7/2015 |
| CN | 105092118 A | | 11/2015 |
| CN | 105094425 A | | 11/2015 |
| CN | 204863062 U | | 12/2015 |
| CN | 106708327 A | | 5/2017 |
| CN | 108277684 A | | 7/2018 |
| CN | 108318059 A | | 7/2018 |
| CN | 207764760 U | | 8/2018 |
| CN | 207764760 U | * | 8/2018 |
| CN | 208207773 U | | 12/2018 |
| CN | 110273322 A | | 9/2019 |

OTHER PUBLICATIONS

CN201910537795.2 first office action.
CN201910537795.2 second office action.

* cited by examiner

NANO PAPER AND PREPARATION METHOD, METHOD FOR IMAGE PROCESSING AND ELECTRONIC DEVICE

TECHNICAL FIELD

The present disclosure relates to the field of displaying, and particularly relates to a nanopaper and a fabricating method thereof, a method of graphic processing and an electronic device.

BACKGROUND

Current handwriting electronic inputting devices have been able to realize inputting on common paper by using a special pen, and saving synchronously the written contents into an electronic device. In other words, a digital pen may be used to record a handwritten content on any paper surface, and the handwritten content may be converted into a digital file, and stored in a commonly used electronic device, such as a mobile phone or a tablet personal computer. However, the modifications on an original manuscript stored in an electronic device by using an intelligent writing tool, for example, the operations such as line modification and content deletion, are still difficult, and the pens provided for handwriting electronic inputting devices are not suitable for operations on the screen of common electronic devices.

Therefore, conventional nanopapers and fabricating methods thereof, methods of graphic processing and electronic devices require to be improved.

SUMMARY

In view of the above, an object of the present disclosure is to provide a nanopaper that can be flexibly operated. Particularly, the nanopaper comprises: a transparent substrate, wherein the transparent substrate comprises a micro-nano-fiber; a plurality of pressure sensing units, wherein the pressure sensing units are located on one side of the transparent substrate, and resistances of the pressure sensing units are able to vary with deformation of the transparent substrate; and a plurality of leads, wherein the plurality of leads are located on the transparent substrate, are connected to the pressure sensing units, and are configured to be able to separately output a sensing signal of each of the plurality of pressure sensing units. Accordingly, the nanopaper can sense the pressure exerted on its surface. Furthermore, the transparent substrate can increase the overall transmittance of the nanopaper, and the nanopaper may be placed over the display screen of the electronic device, and be operated with reference to the graphic displayed by the display screen.

According to an embodiment of the present disclosure, each of the pressure sensing units has a pressure sensing layer, and the pressure sensing layer is formed by a layered nanometer material. That can improve the effect of pressure sensing of the pressure sensing units.

According to an embodiment of the present disclosure, the layered nanometer material comprises at least one of graphene, $MoS_2$, $WS_2$, $MoSe_2$ and $WSe_2$. That can further improve the effect of pressure sensing of the pressure sensing units.

According to an embodiment of the present disclosure, the plurality of pressure sensing units are arranged in an array on the transparent substrate, and the nanopaper further comprises: a plurality of first connecting ports, wherein each of the first connecting ports is located on the transparent substrate and is connected to all of the plurality of pressure sensing units located in the same one row by the leads, or each of the first connecting ports is connected to all of the plurality of pressure sensing units located in the same one column; and a plurality of second connecting ports, wherein the second connecting ports are located on the transparent substrate and are correspondingly connected to the pressure sensing units one to one by the leads. Accordingly, the sensing signal of each of the pressure sensing units can be easily separately outputted, thereby further increasing the sensitivity of the pressure sensing units.

According to an embodiment of the present disclosure, a transmittance of the nanopaper is greater than 90%. Accordingly, the nanopaper has a high transmittance, and, by placing the nanopaper over the display screen, writing can be performed by referring to the frame displayed by the display screen.

According to an embodiment of the present disclosure, the nanopaper further comprises at least one of the following components: a power-supply module, wherein the power-supply module is electrically connected to the pressure sensing units; a Bluetooth-transmission module, wherein the Bluetooth-transmission module is configured to be able to receive the sensing signal of each of the plurality of pressure sensing units; and a fixing-glue layer, wherein the fixing-glue layer is located on one side of the transparent substrate that is not provided with the pressure sensing units, a projection of the fixing-glue layer on the transparent substrate is located at an edge of the transparent substrate, and a surface of one side of the fixing-glue layer that is further away from the transparent substrate has a viscosity. Accordingly, the performance of the nanopaper can be further improved.

In another aspect of the present disclosure, the present disclosure provides a method of graphic processing by using the nanopaper stated above. The method comprises: placing the nanopaper on a display screen of an electronic device, and by using the pressure sensing units of the nanopaper, recording a graphic processing signal performed on a surface of the nanopaper, wherein the graphic processing signal comprises at least one of a pressure-movement-trajectory signal and a pressing-pressure signal; and sending the graphic processing signal to the electronic device, and performing, by the electronic device, graphic processing based on the graphic processing signal. The method can perform graphic processing by using the nanopaper of a simple structure, and can utilize the nanopaper to perform pressure sensing, thereby recording the writing trajectory and the writing pressure. Accordingly, the processing of the graphic in the electronic device can be realized by using simple touch controlling.

According to an embodiment of the present disclosure, the step of performing graphic processing based on the graphic processing signal further comprises: adding, by the electronic device, based on the graphic processing signal, a graphic content into a graphic required to be processed. Accordingly, the processing of content adding to the original graphic can be simply performed.

According to an embodiment of the present disclosure, the step of adding the graphic content comprises: based on the pressure-movement-trajectory signal and the pressing-pressure signal in the graphic processing signal, determining a position, a shape and a color darkness of an added graphic. Accordingly, the effect of the graphic processing can be further improved.

According to an embodiment of the present disclosure, the step of performing graphic processing based on the graphic processing signal further comprises: performing, by the electronic device, based on the graphic processing signal, erasing processing to a graphic required to be processed. Accordingly, the effect of the graphic processing can be further improved.

According to an embodiment of the present disclosure, the erasing processing comprises: based on the pressure-movement-trajectory signal in the graphic processing signal, determining an erasing region, and based on the pressing-pressure signal, regulating a transparency of the graphic in the erasing region. Accordingly, the effect of the graphic processing can be further improved.

According to an embodiment of the present disclosure, an area of the nanopaper is less than an area of the display screen of the electronic device, the display screen is a touch-controlled display screen, and the method further comprises: fixing the nanopaper at a position of the touch-controlled display screen where the graphic processing is required to be performed, and before the nanopaper records the graphic processing signal, pre-calibrating a region where the graphic processing is performed. Accordingly, the effect of the graphic processing can be further improved.

According to an embodiment of the present disclosure, the step of performing, by the electronic device, graphic processing based on the graphic processing signal comprises: comparing the graphic processing signal with a standard signal stored in the electronic device, and based on a comparison result, generating a facsimileing graphic, wherein the facsimileing graphic is an overlaid graphic between a graphic formed based on the standard signal and a graphic formed based on the graphic processing signal. Accordingly, the effect of the graphic processing can be further improved.

In yet another aspect of the present disclosure, the present disclosure provides a method for fabricating a nanopaper. The method comprises: providing a transparent substrate; and forming a plurality of pressure sensing units and a plurality of leads on the transparent substrate, wherein resistances of the pressure sensing units are able to vary with deformation of the transparent substrate, and the pressure sensing units are able to separately output a sensing signal of each of the plurality of pressure sensing units via the leads. Accordingly, the nanopaper having a simple structure can be easily obtained.

In still another aspect of the present disclosure, the present disclosure provides an electronic device. The electronic device comprises: a display screen and a mainboard, wherein the mainboard and the display screen are electrically connected; and the nanopaper stated above, wherein the nanopaper is removably located on the display screen, and the nanopaper is configured to be able to output the sensing signals of the plurality of pressure sensing units to the mainboard. Accordingly, the electronic device has all of the characteristics and the advantages of the nanopaper stated above, which is not discussed here further. In conclusion, the nanopaper can sense the pressure exerted on its surface. Furthermore, the transparent substrate can increase the overall transmittance of the nanopaper, and the nanopaper may be placed over the display screen of the electronic device, and be operated with reference to the graphic displayed by the display screen.

BRIEF DESCRIPTION OF THE DRAWINGS

The above and/or additional aspects and advantages of the present disclosure will become apparent and readily understandable from the following description on the embodiments with reference to the drawings. In the drawings.

DESCRIPTION OF THE REFERENCE NUMBERS

Figure 1:
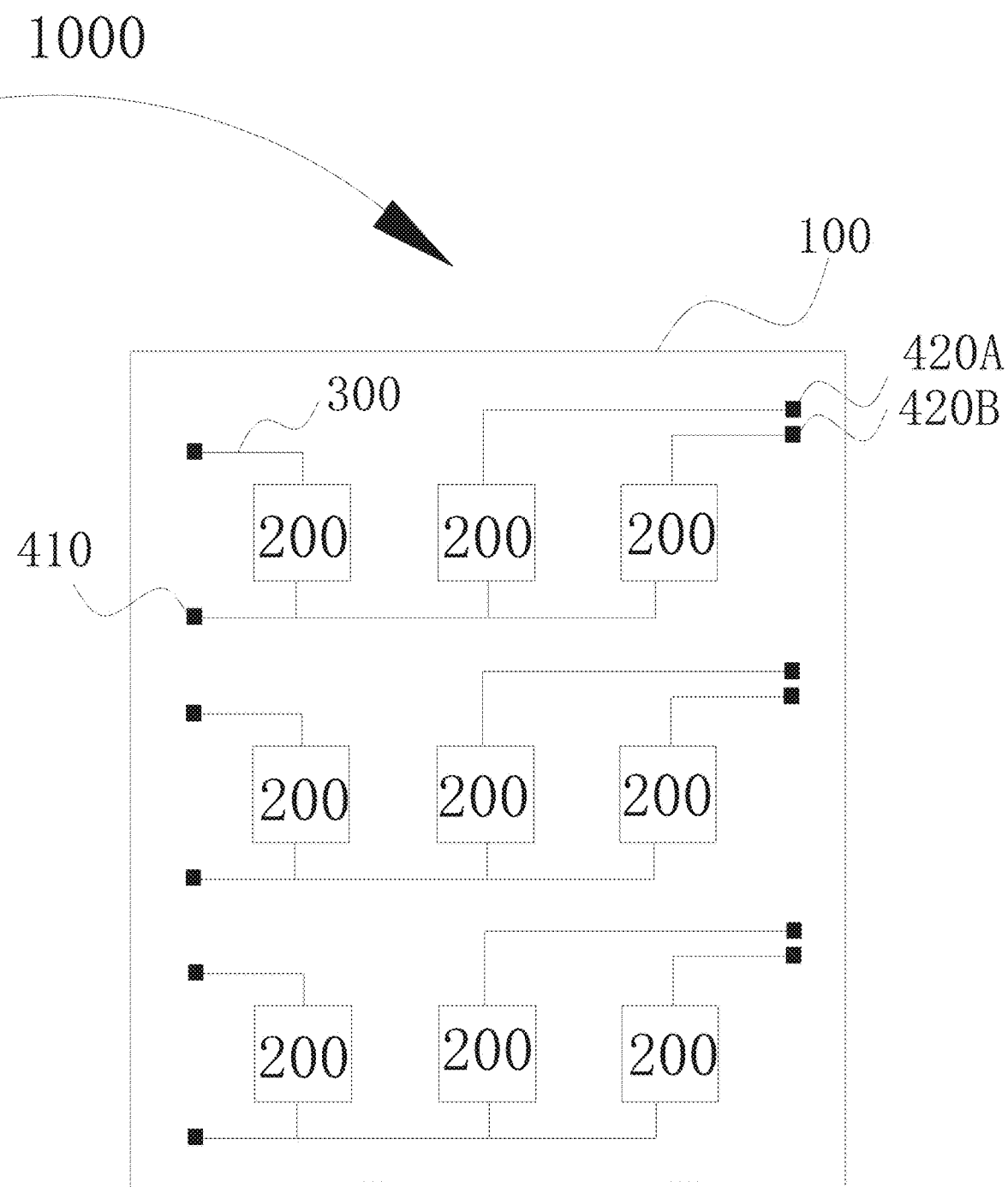
FIG. 1 shows a schematic structural diagram of the nanopaper according to an embodiment of the present disclosure.

1000: nanopaper; 100: transparent substrate; 200: pressure sensing units; 300: leads; 410: first connecting ports; 420: second connecting ports; 500: power-supply module; 600: Bluetooth-transmission module; 700: fixing-glue layer; and 2000: electronic device.

DETAILED DESCRIPTION

The embodiments of the present disclosure will be described in detail below, and the examples of the embodiments are illustrated in the drawings, wherein the same or similar reference numbers throughout the drawings indicate the same or similar elements or elements having the same or similar functions. The embodiments described below with reference to the drawings are exemplary, are merely intended to interpret the present disclosure, and should not be construed as a limitation on the present disclosure.

In an aspect of the present disclosure, an object of the present disclosure is to provide a nanopaper that can be flexibly operated. Particularly, referring to FIG. 1, the nanopaper 1000 comprises a transparent substrate 100, and a plurality of pressure sensing units 200 located on the transparent substrate 100. The transparent substrate comprises a micro-nano-fiber, and therefore it has a high light transmittance and a good flexibility. All of the plurality of pressure sensing units 200 are located on the same one side of the transparent substrate 100, and the resistances of the pressure sensing units 200 can vary with the deformation of the transparent substrate 100. Accordingly, when the surface of the nanopaper is touch-controlled by a pressure, for example, operations such as writing, marking and drawing, then the plurality of pressure sensing units can record the written contents according to the writing trajectory and writing force (i.e., the pressure borne by the surface of the nanopaper), thereby realizing the graphic processing. The nanopaper further comprises a plurality of leads 300, and the plurality of leads 300 are connected to the pressure sensing units 200, and are configured to be able to separately output a sensing signal of each of the plurality of pressure sensing units 200. Accordingly, the nanopaper can sense the pressure exerted on its surface. Furthermore, the transparent substrate can increase the overall transmittance of the nanopaper, and the nanopaper may be placed over the display screen of the electronic device, and be operated with reference to the graphic displayed by the display screen.

The principle of the realizing of the above advantageous effects by the nanopaper and the particular structure of the nanopaper will be explained in detail below according to the particular implementations of the present disclosure:

According to an embodiment of the present disclosure, the transparent substrate 100 may be formed by a transparent, flexible, self-supporting material. For example, a paper that is formed by a fiber of a micrometer size or nanometer size may be used. Because the diameter of the fiber forming the paper is of micrometer or nanometer scale, as compared with conventional papers, the transparent substrate (nanopaper) has better light transmittance and flexibility. Each of the pressure sensing units 200 may have a pressure sensing layer, and the pressure sensing layer is formed by a layered nanometer material. Particularly, the layered nanometer material may be a semiconductor material having a layered structure. For example, the pressure sensing layer may comprise at least one of graphene, $MoS_2$, $WS_2$, $MoSe_2$ and $WSe_2$. In the above layered semiconductor material, because of its layered microstructure, the spacings between the multiple layers of materials may vary with the deformation of the transparent substrate. In the semiconductor material having the layered structure, the electrons mostly flow along the layered planes, and therefore the changing of the spacings between the layered planes can change the overall resistance of the material. Therefore, according to the variation of the resistance of the pressure sensing layer of the pressure sensing unit, it can be determined what point of the nanopaper is exerted a pressure, and, according to the magnitude of the changing of the resistance, the magnitude of the pressure can be determined. Furthermore, because the process is based on the deformation of the transparent substrate, it is not required to use a specific touch-controlling pen to operate the surface of the nanopaper, and the pressure sensing layer can sense the operation of any object that can transmit a pressure. Accordingly, the written contents and the writing pressure on the nanopaper can be determined. Furthermore, because of the characteristics of the material, the layered semiconductor material has a good flexibility, and the transmittance of the layered material is high. Therefore, by forming the pressure sensing layer by using the material, the overall light-transmission property of the nanopaper can be improved, which can further improve the effect of pressure sensing of the pressure sensing units.

According to an embodiment of the present disclosure, the quantity of the pressure sensing units 200 and the particular mode of their arrangement on the transparent substrate 100 are not particularly limited, provided that they can realize the sensing of the writing trajectory on the surface of the nanopaper, which can be designed by a person skilled in the art according to the requirements of the nanopaper on the writing accuracy. For example, the plurality of pressure sensing units 200 may be configured to be arranged in an array on the transparent substrate 100. A person skilled in the art can understand that, when the nanopaper is being used, it is required to send the result of the pressure sensing into the electronic device, to in turn realize, according to the result of the pressure sensing, performing, for example, graphic processing. Therefore, the nanopaper is usually required to be used in cooperation with an electronic device having the function of displaying. In this case, the quantity of the pressure sensing units 200 may be equal to the quantity of the pixels in the display screen of the electronic device, which can realize a pressure sensing precision that matches with the pixels of the display screen, thereby further improving the effect of the graphic processing.

According to an embodiment of the present disclosure, the transparent substrate 100 may further have leads 300 that are connected to the pressure sensing units, and the leads 300 are configured to be able to independently output a pressure sensing signal of each of the plurality of pressure sensing units 200. Accordingly, the plurality of points having the pressure sensing units 200 can independently perform pressure sensing, thereby further improving the degree of precision of the recording of the writing trajectory and force by the nanopaper. Particularly, the nanopaper may further comprise a plurality of connecting ports, and, by using the cooperation between the plurality of connecting ports and the leads 300, separately output the sensing signals of the plurality of pressure sensing units 200. As stated above, when the pressure sensing units 200 are exerted a pressure, the resistance of the pressure sensing layer changes. Therefore, the sensing signal separately outputted from each of the pressure sensing units 200 is merely required to be sufficient to detect the resistance change of each of the pressure sensing units.

According to some particular embodiments of the present disclosure, the pressure sensing units 200 may be arranged in an array on the transparent substrate 100, i.e., arranged into a plurality of rows and a plurality of columns. Accordingly, in an aspect, the regular arrangement can simplify the process of fabricating the pressure sensing units 200, and, in another aspect, the pressure sensing units arranged in an array can match with the arrangement mode of the sub-pixels of the display screen of the electronic device, thereby further improving the effect of the writing by using the electronic paper. In this case, referring to FIG. 1, the transparent substrate 100 may have a plurality of first connecting ports 410, and each of the first connecting ports 410 may be connected to all of the plurality of pressure sensing units 200 located in the same one row by the leads 300. In other words, each of the first connecting ports 410 is connected to a plurality of pressure sensing units 200. Moreover, each of the pressure sensing units 200 may be correspondingly connected to one second connecting port 420, and one second connecting port 420 is connected to merely one pressure sensing unit 200. In other words, each of the pressure sensing units 200 is connected to two connecting ports, wherein the plurality of pressure sensing units located in the same one row are connected to the same one first connecting port 410, and, at the same time, each of the pressure sensing units 200 is further connected to a second connecting port 420 that is merely connected to that pressure sensing unit 200 (for example, 420A and 420B shown in the figure). Accordingly, the magnitude of the resistance change of each of the pressure sensing units 200 can be separately outputted via the first connecting port 410 and the second connecting port 420. A person skilled in the art can understand that the provision of the first connecting ports 410 and the second connecting ports 420 is for the purpose of realizing the separate outputting of the signal of each of the pressure sensing units 200 by using as few connecting ports as possible. It should be understood particularly that, in order to facilitate the comprehension, FIG. 1 shows merely one arrangement mode of the first connecting ports 410 and the second connecting ports 420, and such an arrangement mode cannot be considered as limitation on the present disclosure. For example, the first connecting port may also be connected to the plurality of pressure sensing units 200 located in the same one column. Accordingly, the sensing signal of each of the pressure sensing units can be easily separately outputted, thereby further increasing the sensitivity of the pressure sensing units.

According to an embodiment of the present disclosure, the transmittance of the nanopaper may be greater than 90%. Accordingly, the nanopaper has a high transmittance, and, by placing the nanopaper over the display screen, writing can be performed by referring to the frame displayed by the display screen. In order to increase the transmittance of the nanopaper, the quantity of the layers comprised in the layered material that forms the pressure sensing layer of the pressure sensing units 200 may be controlled, to increase the transmittance of the pressure sensing units 200. The leads 300 may be formed by a transparent electrically conductive material such as ITO, thereby reducing the influence on the transmittance by the traces 300. The first connecting ports and the second connecting ports may be arranged on the edge of the transparent substrate, which can reduce the influence on the transmittance of the center region to the largest extent.

Figure 2:
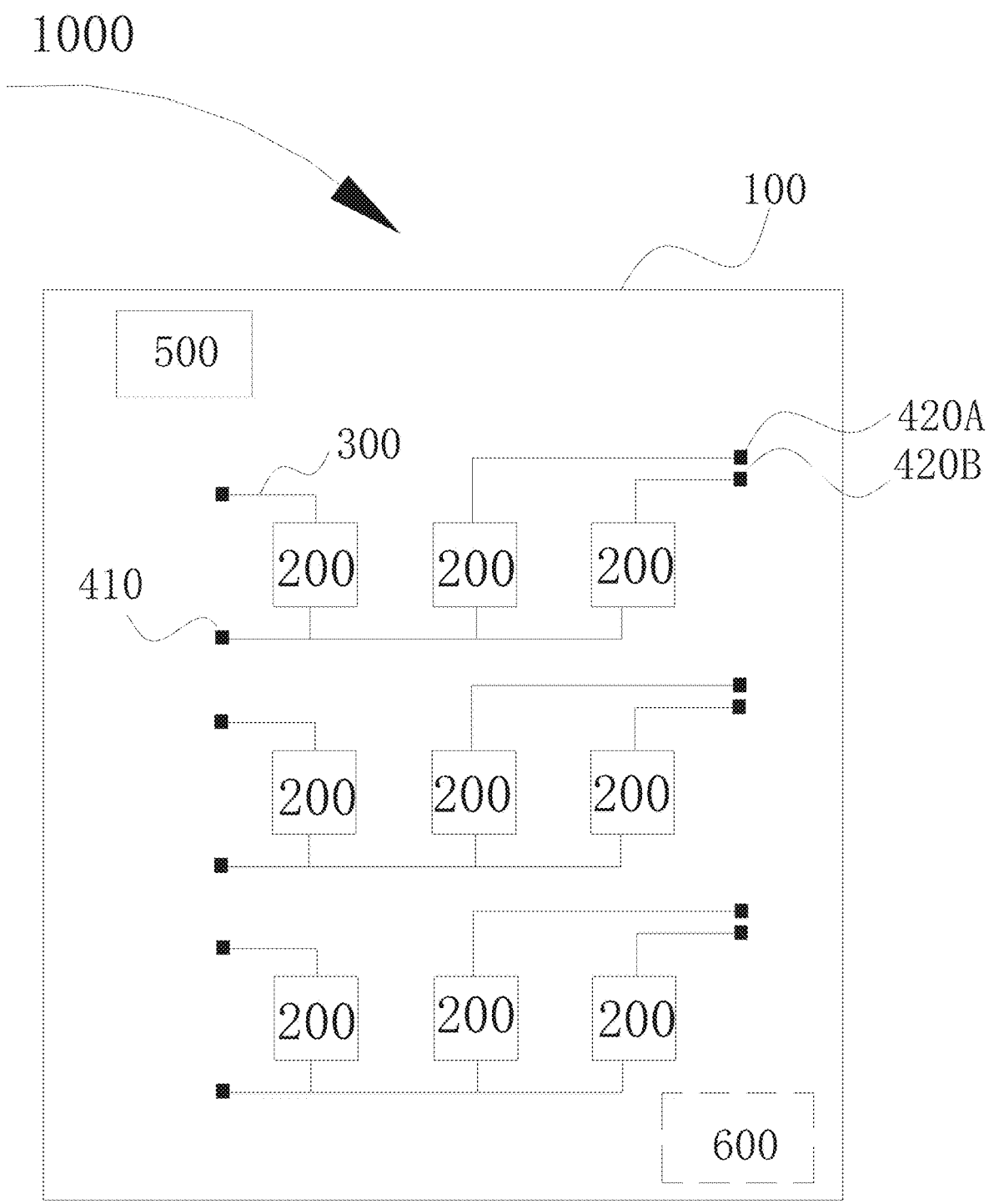
FIG. 2 shows a schematic structural diagram of the nanopaper according to another embodiment of the present disclosure.

According to an embodiment of the present disclosure, In order to further improve the function for use of the nanopaper, referring to FIG. 2, the nanopaper may further comprise a power-supply module 500. The power-supply module 500 is electrically connected to the pressure sensing units 200, and can supply electric power to the pressure sensing units 200, whereby the nanopaper can be used without an extra external power supply. Especially, when the nanopaper and an electronic device are combined for graphic processing, the nanopaper cannot require electric power supply from the electronic device. In order to facilitate the transmission of pressure sensing data, the nanopaper may further have a Bluetooth-transmission module 600. The Bluetooth-transmission module 600 is configured to be able to receive the sensing signal of each of the plurality of pressure sensing units. Accordingly, by using Bluetooth wireless transmission, the pressure sensing signal of the nanopaper can be sent to the electronic device, thereby realizing functions such as graphic processing.

Figure 3:
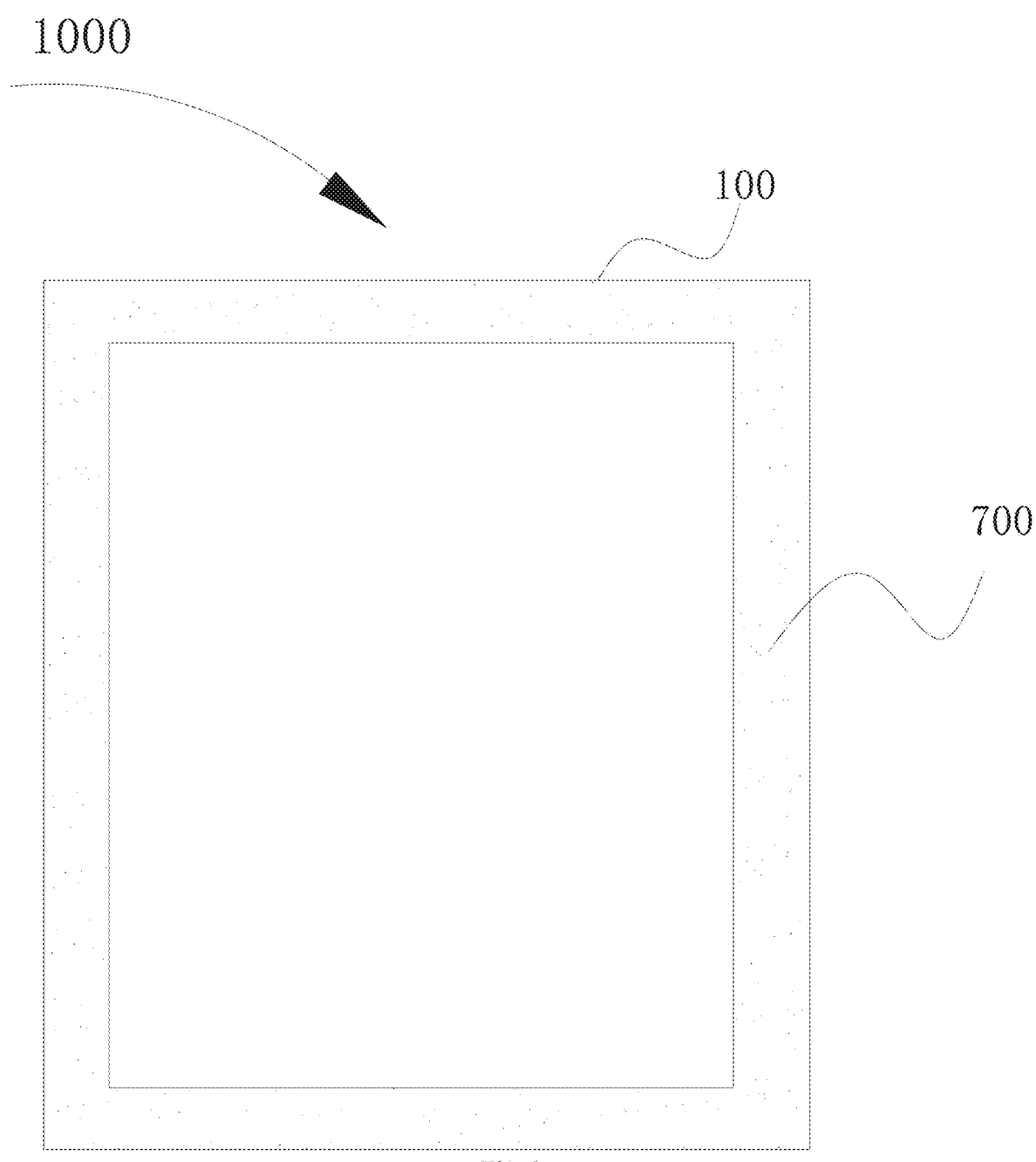
FIG. 3 shows a schematic partial structural diagram of the nanopaper according to an embodiment of the present disclosure.

According to some embodiments of the present disclosure, referring to FIG. 3, in order to further improve the performance for use of the nanopaper, prevent movement, wrinkling and so on of the nanopaper in writing, and cause inaccuracy of the detection of the writing trajectory, a fixing-glue layer 700 may further be provided on one side of the transparent substrate 100 that is not provided with the pressure sensing units 200. Particularly, the projection of the fixing-glue layer 700 on the transparent substrate 100 may be located at the edge of the transparent substrate 100, and the surface of the fixing-glue layer 700 that is further away from the transparent substrate 100 has a viscosity. Accordingly, the transparent substrate 100 may be fixed to a smooth surface by using the fixing-glue layer 700, for example, to a display screen of an electronic device. The one side of the fixing-glue layer 700 that contacts the transparent substrate 100 may have a higher viscosity, while the one side that is further away from the transparent substrate 100 may have a lower viscosity. Accordingly, by using the fixing-glue layer 700, the nanopaper can have the function similar to that of a sticky note. When adhesive fixing is required, it can be adhered to a smooth surface by using the one side having a lower viscosity, and, after the usage, because the one side that is further away from the transparent substrate 100 has a lower viscosity, the nanopaper can be removed from the screen without damaging the nanopaper. When the nanopaper is to be stored, it is merely required to provide a component such as a release liner or a release paper on the one side of the fixing-glue layer 700 that is further away from the transparent substrate 100. The fixing-glue layer 700 may not cover the whole surface of the transparent substrate 100, and is merely required to be able to serve to fix.

In another aspect of the present disclosure, the present disclosure provides a method of graphic processing by using the nanopaper stated above. According to an embodiment of the present disclosure, the method may comprise the following steps: placing the nanopaper on a display screen of an electronic device, and performing operations such as writing on the nanopaper; and by using the pressure sensing units of the nanopaper, recording a graphic processing signal performed on a surface of the nanopaper (generated by the writing operation). The graphic processing signal comprises at least one of a pressure-movement-trajectory signal and a pressing-pressure signal. Subsequently, the method may comprise sending the graphic processing signal to the electronic device, and performing, by the electronic device, graphic processing based on the graphic processing signal. The method can perform graphic processing by using the nanopaper of a simple structure, and can utilize the nanopaper to perform pressure sensing, thereby recording the writing trajectory and the writing pressure. Accordingly, the processing of the graphic in the electronic device can be realized by using simple touch controlling.

The particular operations of the above method of graphic processing will be explained in detail below according to the particular embodiments of the present disclosure.

As stated above, the above-described nanopaper can record the trajectory of the pressure exerted on the surface of the nanopaper and the pressure value of the pressure. Furthermore, because the nanopaper according to the embodiments of the present disclosure has a high transmittance, it may be placed over the electronic device, and operations such as writing and marking may be performed based on the particular position of the frame displayed by the display screen of the electronic device. All of the operations such as writing and marking may be recorded by the pressure sensing units. The result of the sensing is the graphic processing signal. After the signal has been transmitted to the electronic device, the graphic stored in the electronic device can be modified and processed based on the graphic processing signal.

It should be understood particularly that, in the present disclosure, the "graphic processing" should be comprehended broadly, wherein it does not only include the processing to pictures, but also include the processing to texts. For the nanopaper, pictures and texts merely differ in the trajectories of the pressure sensing, and the difference does not influence the process of the pressure sensing. Similarly, for electronic devices, the modification on the pictures or the modification on the texts of a particular displayed frame merely differ in the displayed contents, and the difference does not influence the particular processing method. In other words, the graphic processing method according to the present disclosure may not only include the processing to pictures, but may also include processing such as adding marking and deleting texts.

Figure 4:
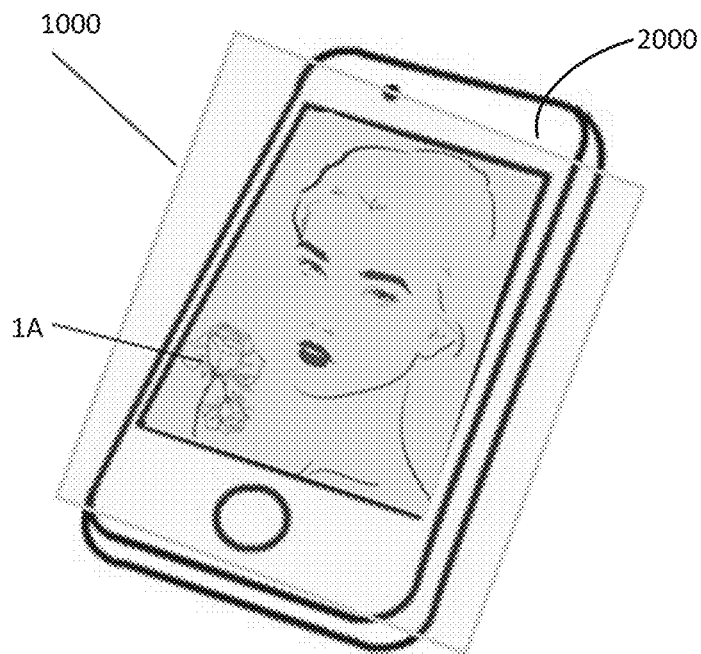
FIG. 4 shows a schematic diagram of the method of graphic processing according to an embodiment of the present disclosure.

According to an embodiment of the present disclosure, the step of performing graphic processing based on the graphic processing signal may be adding, by the electronic device, based on the graphic processing signal, a graphic content into a graphic required to be processed. Particularly, referring to FIG. 4, the nanopaper 1000 may be placed over the display screen of an electronic device 2000, and at this point the display screen may be used to display the graphic required to be processed, for example, the portrait shown in the figure. In this case, writing or drawing may be performed on the surface of the nanopaper 1000 by using an object such as a finger of the user and an object that is not too sharp (for example, a pen that does not have the function of writing), to form the graphic content 1A intended to be added at the corresponding position of the graphic required to be processed, for example, the flower shown in FIG. 4. During the drawing on the nanopaper, the shape of the added graphic may be recorded by recording the trajectory of the pressure changing, for example, the lines forming a flower. Moreover, the color darknesses and the thicknesses of the lines may be expressed by the numerical values of the pressure, wherein the heavier the writing, the greater the pressure value sensed by a pressure sensor. After the sensing data have been sent to the processor of the electronic device, the processor may, according to the pressure values, determine the thicknesses of the lines, or the color darknesses of the lines. After the parameters of the added graphic content such as the position, the lines, the color and the line thickness have been determined, the added graphic content is accordingly determined. Accordingly, the processor can add a particular graphic into a graphic (portrait), for example, the flower shown in FIG. 4.

Figure 5:
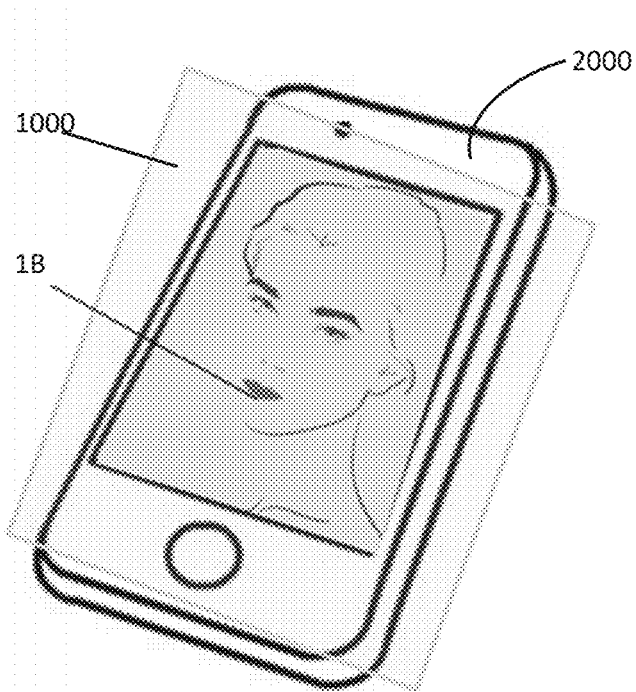
FIG. 5 shows a schematic diagram of the method of graphic processing according to another embodiment of the present disclosure.

Similarly, according to an embodiment of the present disclosure, the method may further be configured for changing the color of a particular position in a graphic. For example, referring to FIG. 5, the method may comprise firstly operating the electronic device, for example, selecting the mode of changing color in an application program, and, subsequently, performing an operation similar to color filling at a particular position of the nanopaper. For example, when it is intended to change the color of the lip (for example, 1B shown in the figure) of the portrait displayed in FIG. 5, the operation may be performed at the corresponding position of the nanopaper by using a finger or a pen. Because the nanopaper 1000 has a high transmittance, in operation, the user can observe the content displayed by the display screen of the electronic device through the nanopaper, thereby accurately determining the operated region. At this point, after the graphic processing signal has been transmitted to the electronic device by using the particular position of the operation and the pressure of the operation recorded by the nanopaper, the processor may, according to the particular position of the operation, process the color of the corresponding region in the graphic, to change the color of the particular region of the displayed graphic. Furthermore, the darknesses of the colors added at different positions may be determined according to the numerical values of the pressure of the touch controlling.

Similarly, according to an embodiment of the present disclosure, the method may further be configured for deleting a particular content in a graphic, i.e., performing, by the electronic device, based on the graphic processing signal, erasing processing to a graphic required to be processed. For example, the method may comprise selecting an eraser mode in an application software and so on, and subsequently touching the region required to be erased. After the touching path (i.e., the pressure-movement-trajectory signal) has been transmitted to the processor of the electronic device, the processor may delete the graphic content at that position. According to other embodiments of the present disclosure, the pressure of the touching may further be recorded, and different pressure-numerical-value intervals may correspond to the heavinesses of the erasing operation. In other words, when the force is heavier, the content of the operated region may be completely deleted. When the touching force is smaller, the graphic content of that region may be configured to be faded out; at this point, the graphic of that region is not completely deleted, but the transmittance of that region is configured to be increased, thereby in turn exhibiting the visual effect of fading-out of the graphic content. The pressures exerted on the nanopaper may be graded, wherein at different grades, the transmittances (or referred to as transparencies) of particular regions of the processed graphic are also different. Accordingly, the method can be used for diversified operations of graphic processing. It should be understood particularly that the particular mode of the above content deletion or the fading-out of the displayed content in a particular region of the graphic is not particularly limited, and the above mode, in which both of the pressure and the transmittance of the displayed content of the graphic are graded, is merely one of the implementations, and should not be construed as a limitation on the present disclosure. For example, the pressure and the transmittance may also not be graded. Instead, the method may comprise drawing standard curves of the pressure numerical value and the transmittance, then, according to the pressure numerical value exerted on the nanopaper, determining the transmittance corresponding to each point on the pressure movement trajectory, and then processing the graphic according to the transmittances.

According to an embodiment of the present disclosure, the above method for processing a graphic is required to be implemented by using the nanopaper and an electronic device, and the display screen of the electronic device may be a touch-controlled display screen. In this case, in order to prevent the user from accidentally starting up the touch-controlling function of the touch-controlled display screen while operating the nanopaper, before the operation on the nanopaper, the touch-controlling sensing on the region where the nanopaper is located by the touch-controlling sensor of the touch-controlled display screen may be stopped by using, including but not limited to, an application software and so on.

Figure 6:
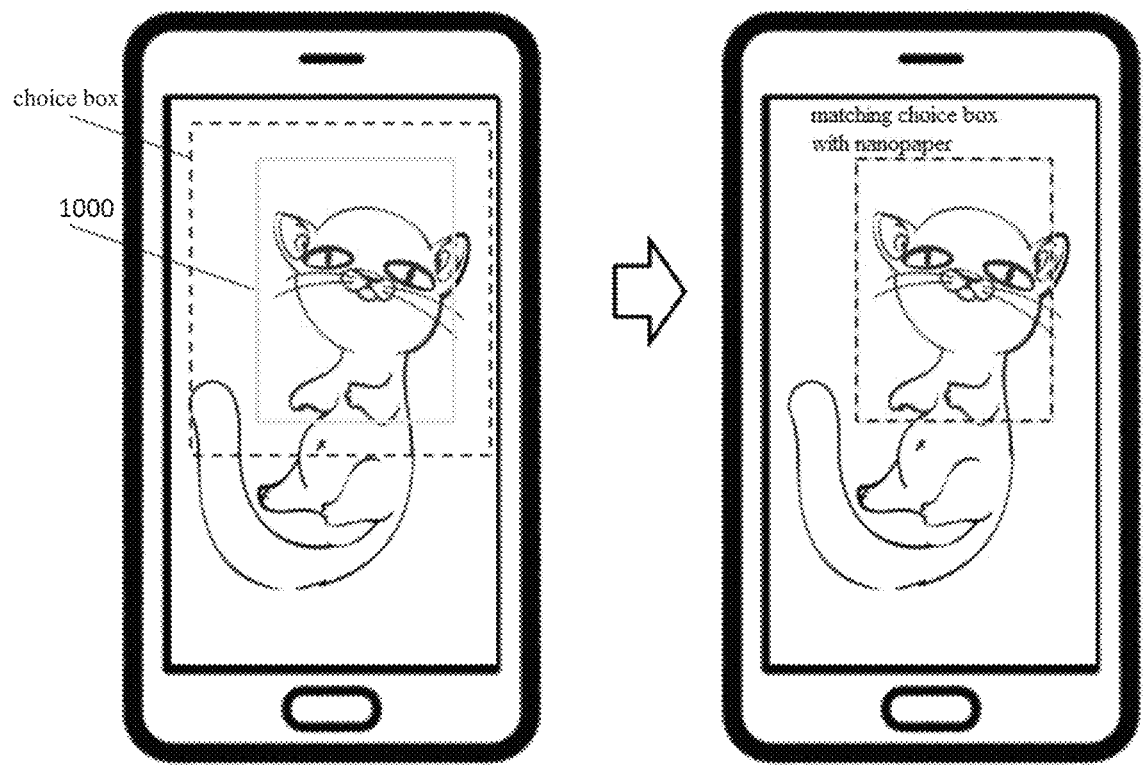
FIG. 6 shows a schematic diagram of the calibration of the region where the graphic processing is performed according to an embodiment of the present disclosure.

According to an embodiment of the present disclosure, the area of the nanopaper may be less than the area of the display screen of the electronic device. In this case, before the operation on the nanopaper, the method may further comprise a step of calibrating the region required to undergo graphic processing. Particularly, referring to FIG. 6, and the display screen of the electronic device may be a touch-controlled display screen, and the calibration may be performed by using the following steps: fixing the nanopaper at a position of the touch-controlled display screen where the graphic processing is required to be performed. As shown in FIG. 6, the nanopaper 1000, because of its smaller size, can merely cover part of the displayed content (for example, as shown in the figure, covering part of the area over the cartoon graphic). In this case, while the graphic required to be processed is being displayed, simultaneously a choice box that can be dragged and can be variable in size may be displayed by using the touch-controlled display screen. Before operating on the nanopaper, the user in advance operates the touch-controlled display screen, to reduce the choice box to be equal to the nanopaper 1000 in size, and drags the choice box, to match the edge of the choice box with the nanopaper. Accordingly, the touch-controlled screen can determine the region for fixing the nanopaper according to the operation on the choice box by the user, and, subsequently, after receiving the graphic processing signal of the nanopaper 1000, perform the graphic processing to the particular region (the region selected by using the choice box) according to the signal.

Figure 7:
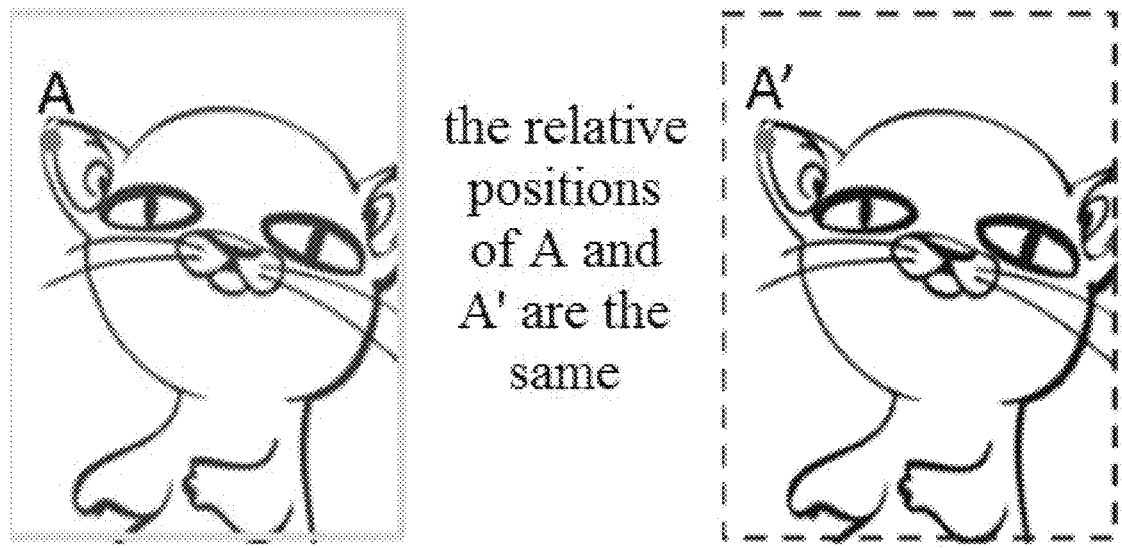
FIG. 7 shows a schematic diagram of the calibration of the region where the graphic processing is performed according to another embodiment of the present disclosure.

Alternatively, referring to FIG. 7, the step of calibrating the region required to undergo graphic processing may also be performed by using the following steps: before the graphic processing by using the nanopaper, firstly displaying the graphic required to be processed by using the touch-controlled display screen, wherein the graphic contains a position determining point, for example, the point A shown in the figure. Subsequently, the nanopaper is fixed to the display screen. Because the nanopaper has a good transmittance, at this point, the graphic displayed on the display screen is still visible to the user. At this point, the user may touch the position on the surface of the nanopaper that corresponds to the determining point A on the display screen, for example, A' shown in the figure. Accordingly, after the graphic processing signal has been transmitted to the processor of the electronic device, the sensing point A' on the nanopaper may be corresponded to the position determining point A, to complete the calibration on the region of graphic processing. According to some embodiments of the present disclosure, the position determining point may be one or more position determining points.

In other embodiments of the present disclosure, the step of calibrating the region required to undergo graphic processing may also be performed by using the following steps: After the nanopaper has been placed over the display screen, the region of the display screen that has been adhered the nanopaper may be configured to have no response to touch controlling. At this point, the region of the display screen that has been adhered the nanopaper and the region at the periphery of the edge of the nanopaper may be touch-controlled in reciprocating by using a finger and so on. At this point, the region having the nanopaper has no response to touch controlling, while the region at the periphery of the edge of the nanopaper can sense the touch controlling by the finger. Accordingly, by using the touch-controlling region of the finger, a hollow region that does not sense touch controlling can be determined, and the region corresponds to the region where the nanopaper is located. That can realize the calibration of the graphic processing region.

In the present disclosure, merely some of the particular embodiments of the graphic processing are listed. Actually, a person skilled in the art can understand that all of the operations that can be performed according to the graphic processing signal recorded by the nanopaper can realize graphic processing by using the above method. In other words, all of the cases of graphic processing that can be performed according to the pressure movement trajectory and the pressing-pressure signal of the operation on the surface of the nanopaper can be realized by using the method according to the present disclosure. For example, the method according to the embodiments of the present disclosure can further be used to realize the function similar to facsimileing graphic. Taking the facsimileing of a calligraphic work as an example, in writing or drawing, all of the force, the pen trajectory and the staying duration of the work have significant influences on the final work. The nanopaper may be used to record the habits in writing of the user, and, by using the electronic device and an application program, facilitate to analyze writing errors or points required to be improved. More particularly, in writing, the penning-down should not be too heavy, or else the characters seem "soft". The pen movement should not be too slow, and the pace should be controlled. However, by using the nanopaper according to the embodiments of the present disclosure, the trajectory and the force (the pressure value of the pressing) of the pen movement by the user may be recorded, and therefore an application software similar to a teaching program may be added into the electronic device, which grades the pressures and makes a map, to enable the user to better feel how to correctly and smoothly write or draw. The display screen of the electronic device may also be utilized to display works of calligraphy or drawing, the user may perform facsimileing on the interface of the nanopaper, and the facsimileing work may be stored in the electronic device, to facilitate comparison. Particularly, the graphic processing signal generated by the facsimileing operation on the nanopaper by the user may be, in the electronic device, compared with a standard signal (i.e., the original work that is facsimiled by the user) stored in the electronic device, and a facsimileing graphic may be generated based on the comparison result. The facsimileing graphic is an overlaid graphic between the graphic formed based on the standard signal (original work) and the graphic formed based on the graphic processing signal (the result of the facsimileing by the user). Accordingly, the difference between the user facsimileing work and the original work can be easily displayed, which can better improve the level of the user in drawing and calligraphy.

In yet another aspect of the present disclosure, the present disclosure provides a method for fabricating a nanopaper. According to an embodiment of the present disclosure, the nanopaper fabricated by using the method may be the nanopaper stated above. Therefore, the nanopaper obtained by using the method has the characteristics and the advantages the same as those of the nanopaper stated above, which is not discussed here further. Particularly, the method may comprise: providing a transparent substrate; and forming a plurality of pressure sensing units and a plurality of leads on the transparent substrate, wherein resistances of the pressure sensing units are able to vary with deformation of the transparent substrate, and the pressure sensing units are able to separately output a sensing signal of each of the plurality of pressure sensing units via the leads. Accordingly, the nanopaper having a simple structure can be easily obtained.

According to some particular embodiments of the present disclosure, the method of fabricating the nanopaper may comprise: by using a transparent nanopaper formed by a fiber having the diameter of the nanometer scale as the transparent substrate, by providing a mask and metal vapor deposition, firstly forming the plurality of leads. The arrangement and the positions of the plurality of leads may be those described above, and are not discussed here further. It should be understood particularly that, here, the metal thickness of the vapor-deposited metal should be controlled, and, on the precondition that the function of electric conduction should be ensured, the thickness of the leads is required to be controlled to be as low as possible, to prevent adversely affecting the overall transmittance of the nanopaper. Subsequently, the mask is removed, and, by using another mask for forming the pressure sensing units, on the transparent substrate formed with the leads, the pressure sensing units formed by graphene are formed. Accordingly, the nanopaper can be easily formed.

In still another aspect of the present disclosure, the present disclosure provides an electronic device. The electronic device comprises a display screen and a mainboard, wherein the mainboard and the display screen are electrically connected. The electronic device is further provided with the nanopaper stated above, wherein the nanopaper is removably located on the display screen, and the nanopaper is configured to be able to output the sensing signals of the plurality of pressure sensing units to the mainboard. Accordingly, the electronic device has all of the characteristics and the advantages of the nanopaper stated above, which is not discussed here further. In conclusion, the nanopaper can sense the pressure exerted on its surface. Furthermore, the transparent substrate can increase the overall transmittance of the nanopaper, and the nanopaper may be placed over the display screen of the electronic device, and be operated with reference to the graphic displayed by the display screen.

In the description of the present disclosure, the terms that indicate orientation or position relations, such as "upper", "lower", "inner" and "outer", are based on the orientation or position relations shown in the drawings, and are merely for conveniently describing the present disclosure, rather than requiring that the present disclosure must be constructed and operated according to the specific orientation. Therefore, they should not be construed as a limitation on the present disclosure.

In the description of the present disclosure, the description referring to the terms "an embodiment", "another embodiment" and so on means that particular features, structures, materials or characteristics described with reference to the embodiment are comprised in at least one of the embodiments of the present disclosure. In the description, the illustrative expressions of the above terms do not necessarily relate to the same embodiment or example. Furthermore, the described particular features, structures, materials or characteristics may be combined in one or more embodiments or examples in a suitable form. Moreover, subject to avoiding contradiction, a person skilled in the art may combine different embodiments or examples described in the description and the features of the different embodiments or examples. In addition, it should be noted that, in the description, the terms "first" and "second" are merely for the purpose of describing, and should not be construed as indicating or implying the degrees of importance or implicitly indicating the quantity of the specified technical features.

Although the embodiments of the present disclosure have already been illustrated and described above, it can be understood that the above embodiments are illustrative, and should not be construed as a limitation on the present disclosure, and a person skilled in the art may make variations, modifications, substitutions and improvements to the above embodiments within the scope of the present disclosure.

The invention claimed is:

1. A method of graphic processing by using a nanopaper, wherein the nanopaper comprises:
    a transparent substrate, wherein the transparent substrate comprises a micro-nano-fiber;
    a plurality of pressure sensing units, wherein the plurality of pressure sensing units are located on one side of the transparent substrate, and resistances of the plurality of pressure sensing units are able to vary with deformation of the transparent substrate; and
    a plurality of leads, wherein the plurality of leads are located on the transparent substrate, are connected to the plurality of pressure sensing units, and are configured to be able to separately output a sensing signal of each of the plurality of pressure sensing units;
    the method comprises:
    placing the nanopaper on a display screen of an electronic device, and by using the plurality of pressure sensing units of the nanopaper, recording a graphic processing signal performed on a surface of the nanopaper, wherein the graphic processing signal comprises at least one of a pressure-movement-trajectory signals and a pressing-pressure signal; and
    sending the graphic processing signal to the electronic device, and performing, by the electronic device, graphic processing based on the graphic processing signal.

2. The method according to claim 1, wherein the performing graphic processing based on the graphic processing signal further comprises:
    adding, by the electronic device, based on the graphic processing signal, a graphic content into a graphic required to be processed.

3. The method according to claim 2, wherein the adding the graphic content comprises:
    based on the pressure-movement-trajectory signal and the pressing-pressure signal in the graphic processing signal, determining a position, a shape and a color darkness of an added graphic.

4. The method according to claim 1, wherein the performing graphic processing based on the graphic processing signal further comprises:
    performing, by the electronic device, based on the graphic processing signal, erasing processing to a graphic required to be processed.

5. The method according to claim 4, wherein the erasing processing comprises:
    based on the pressure-movement-trajectory signal in the graphic processing signal, determining an erasing region, and based on the pressing-pressure signal, regulating a transparency of a graphic in the erasing region.

6. The method according to claim 1, wherein an area of the nanopaper is less than an area of the display screen of the electronic device, the display screen is a touch-controlled display screen, and the method further comprises:
    fixing the nanopaper at a position of the touch-controlled display screen where the graphic processing is required to be performed, and before the nanopaper records the graphic processing signal, pre-calibrating a region where the graphic processing is performed.

7. The method according to claim 1, wherein the performing, by the electronic device, graphic processing based on the graphic processing signal comprises:
    comparing the graphic processing signal with a standard signal stored in the electronic device, and based on a comparison result, generating a facsimileing graphic, wherein the facsimileing graphic is an overlaid graphic between a graphic formed based on the standard signal and a graphic formed based on the graphic processing signal.

8. An electronic device, wherein the electronic device comprises:
    a display screen and a mainboard, wherein the mainboard and the display screen are electrically connected; and
    a nanopaper, wherein the nanopaper comprises:
    a transparent substrate, wherein the transparent substrate comprises a micro-nano-fiber;
    a plurality of pressure sensing units, wherein the plurality of pressure sensing units are located on one side of the transparent substrate, and resistances of the plurality of pressure sensing units are able to vary with deformation of the transparent substrate; and
    a plurality of leads, wherein the plurality of leads are located on the transparent substrate, are connected to the plurality of pressure sensing units, and are configured to be able to separately output a sensing signal of each of the plurality of pressure sensing units; and the nanopaper is removably located on the display screen, and the nanopaper is configured to be able to output the sensing signals of the plurality of pressure sensing units to the mainboard.

9. The electronic device according to claim 8, wherein each of the plurality of pressure sensing units has a pressure sensing layer, and the pressure sensing layer is formed by a layered nanometer material.

10. The electronic device according to claim 9, wherein the layered nanometer material comprises at least one of graphene, $MoS_2$, $WS_2$, $MoSe_2$ and $WSe_2$.

11. The electronic device according to claim 8, wherein the plurality of pressure sensing units are arranged in an array on the transparent substrate, and the nanopaper further comprises:
- a plurality of first connecting ports, wherein each of the plurality of first connecting ports is located on the transparent substrate and is connected to all of the plurality of pressure sensing units located in the same one row by the plurality of leads, or each of the plurality of first connecting ports is connected to all of the plurality of pressure sensing units located in the same one column; and
- a plurality of second connecting ports, wherein the second connecting ports are located on the transparent substrate and are correspondingly connected to the plurality of pressure sensing units one to one by the leads.

12. The electronic device according to claim 8, wherein a transmittance of the nanopaper is greater than 90%.

13. The electronic device according to claim 8, wherein the nanopaper further comprises at least one of:
- a power-supply module, wherein the power-supply module is electrically connected to the plurality of pressure sensing units;
- a Bluetooth-transmission module, wherein the Bluetooth-transmission module is configured to be able to receive the sensing signal of each of the plurality of pressure sensing units; and
- a fixing-glue layer, wherein the fixing-glue layer is located on one side of the transparent substrate that is not provided with the plurality of pressure sensing units, a projection of the fixing-glue layer on the transparent substrate is located at an edge of the transparent substrate, and a surface of one side of the fixing-glue layer that is further away from the transparent substrate has a viscosity.

* * * * *